United States Patent [19]

Cox, Jr.

[11] 3,840,256
[45] Oct. 8, 1974

[54] CONNECTOR STRUCTURE
[75] Inventor: John A. Cox, Jr., Sycamore, Ill.
[73] Assignee: Ideal Industries, Inc., Sycamore, Ill.
[22] Filed: Mar. 31, 1972
[21] Appl. No.: 240,027

Related U.S. Application Data
[63] Continuation-in-part of Ser. Nos. 143,896, May 17, 1971, and Ser. No. , , which is a continuation-in-part of Ser. No. 818,905, April 24, 1969, abandoned.

[52] U.S. Cl................... 285/174, 285/245, 285/161, 285/331, 285/286, 285/424
[51] Int. Cl.............................................. F16l 55/00
[58] Field of Search .......... 285/245, 251, 331, 424, 285/161, 390, 177, 174, 12, 39, 175, 149, 286, 287

[56] References Cited
UNITED STATES PATENTS
1,440,508  1/1923  Todd.............................. 285/174 X
2,696,394 12/1954  Kaiser ................... 285/251
2,821,413  1/1958  Krapp ............................ 285/177 X
3,246,921  4/1966  Lyon et al...................... 285/251 X
3,441,296  4/1969  Wilkin .......................... 285/245 X
3,542,406 11/1970  Metcalf........................ 285/390 X FOREIGN PATENTS OR APPLICATIONS
253,751   6/1926   Great Britain..................... 285/251
1,383,003 11/1964  France.............................. 285/177

Primary Examiner—Dave W. Arola
Attorney, Agent, or Firm—Kinzer, Plyer, Dorn & McEachran

[57] ABSTRACT

This is a fabricated connector for joining flexible conduit to a terminus, such as a box or enclosure or the like. The connector has a sheet metal housing with a conduit-receiving portion at one end and a mounting arrangement for fitting to the terminus at the other so that the connector can be machine assembled to precut lengths of conduit.

13 Claims, 4 Drawing Figures

CONNECTOR STRUCTURE

This is a continuation-in-part of co-pending application Ser. No. 143,896, filed May 17, 1971, which was a continuation-in-part of co-pending application Ser. No. 818,905, filed Apr. 24, 1969, and now abandoned.

SUMMARY OF THE INVENTION

This invention is concerned with a connector for joining flexible conduit to a terminus, such as an electrical junction box or the like.

A primary object of the invention is a fabricated flexible conduit connector.

Another object is a lightweight, inexpensive flexible conduit connector.

Another object is a connector of the above type which can be machine fitted to pre-cut lengths of flexible conduit.

Another object is a connector of the above type which compresses the outer elastic jacket of the flexible metallic conduit to provide a liquid tight seal.

Another object is a connector specifically intended for shop installation.

Another object is a connector of the above type which requires a minimum number of parts.

Another object is a fitting of the above type that can be fitted to the ends of pre-cut conduit before it's taken out to the building site.

Other objects will appear from time to time in the ensuing specification and drawings.

DESCRIPTION OF THE PREFERRED EMBODIMENT

Figure 1:
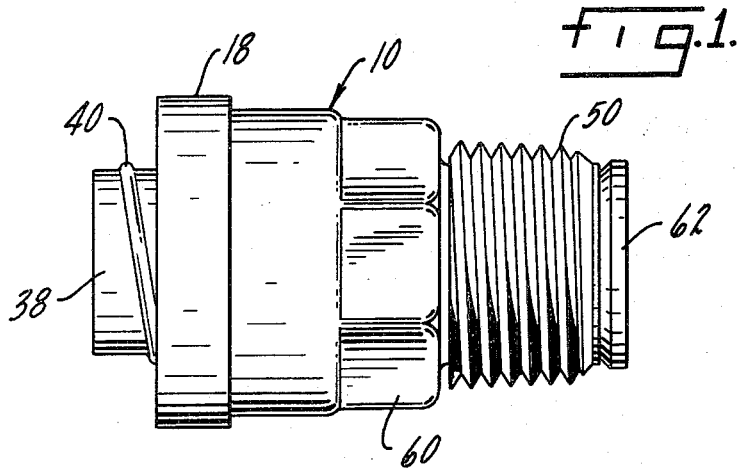
FIG. 1 is a side view of a connector assembly.
Figure 2:
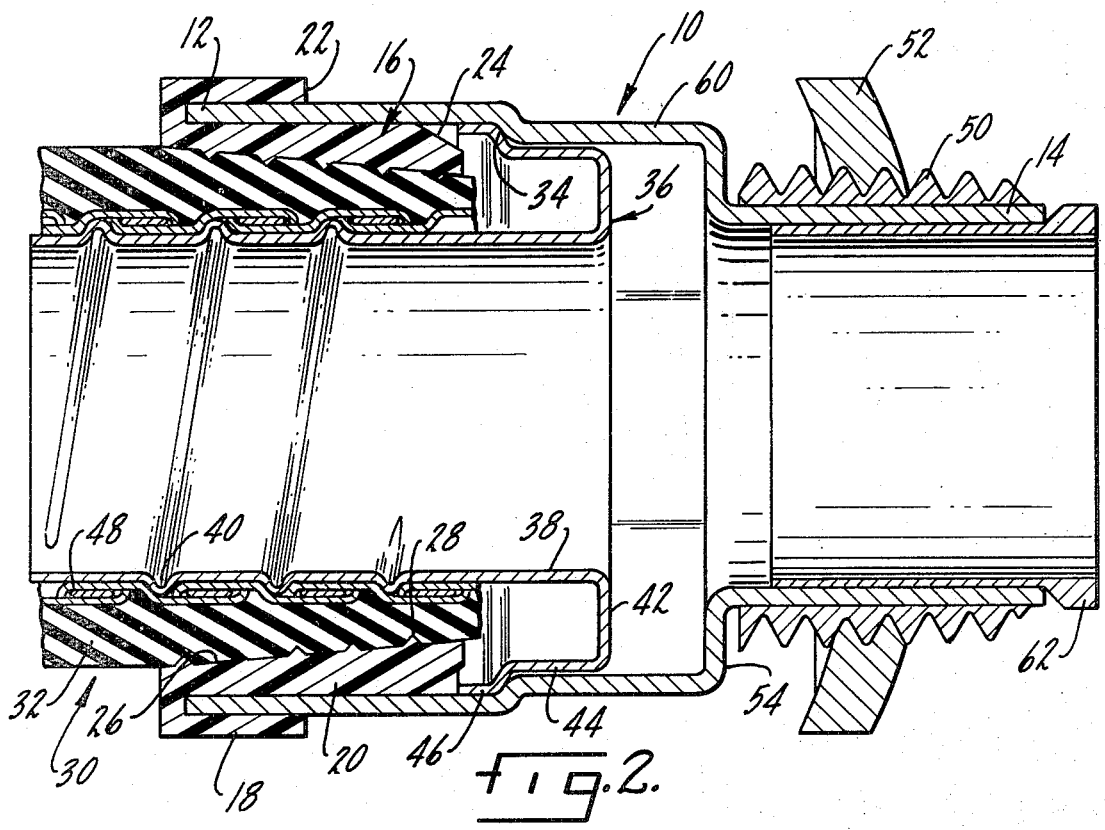
FIG. 2 is a section of FIG. 1, on an enlarged scale.

In FIGS. 1 and 2, a connector for flexible metallic conduit is shown and includes an outer housing 10 which may be formed of sheet metal or the like and has generally an open large end 12 and small end 14. The housing may be considered to be generally cylindrical except as otherwise indicated. The large end 12 has an inner housing 16 mounted thereon which is shown as made of plastic and includes an outer portion 18 which fits out and around the large end 12 of the housing and an inner portion 20 which projects inwardly. Another way of looking at it is that the inner housing 16 has an annular slot formed at the shoulder 22 into which the end 12 of the main housing extends. The fit between these two parts should be liquid tight and the slot might even be a shade undersized so that when the plastic inner housing 16 is driven onto the main housing, it will form a liquid tight wedged fit. There will be some "give" in the plastic which will allow it to accommodate itself to the end 12 of the housing.

The inner part 20 of the inner housing has a bevel 24 on the outer edge thereof to aid in assembly and the inner surface 26 thereof is tapered inwardly with a thread detail 28 formed thereon. The dimensioning is such that when the flexible conduit, indicated at 30, is inserted and turned, the thread detail 28 will indent or compress into the flexible covering 32 on the conduit.

The outer housing 10 has an offset or shoulder 34 against which a pilot 36 abuts. The pilot itself includes an inner cylindrical portion 38 with a thread detail 40 suitably formed therein, for example by rolling, with a flange or flare 42 at the end formed into an outer octagonal area 44 with a cylindrical offset 46 at the end thereof which abuts the offset 34 in the outer housing.

The thread detail 40 in the pilot matches the threads or convolutions in the metal sheathing 48 which is the center core in the flexible conduit. The result is that, when the flexible conduit is slipped over the pilot and the two surfaces intermesh, the housing may be rotated which will cause the outer housing or connector to be drawn down over the flexible conduit resulting in the thread detail 28 in the tapered surface of the inner housing to compress its way along and into the flexible outer sheathing 32. It will be noted in FIG. 2 that this sheathing is compressed perceptibly as you move in and the thread detail on the taper has taken a firm grip or bite on the end of the conduit. The pitch of the threads 28 on the taper should be the same as the pitch of the threads 40 on the pilot so that they do not fight each other.

The small end of the housing 14 has a male thread detail 50 on the outside thereof which may be formed as a separate sleeve with threads suitably formed thereon, for example by machine, after which the sleeve may be slipped on to the end 14 and brazed in place. This male thread form may accept a conventional lock washer 52. The small end 14 of the housing expands out at 54 to an intermediate area 60 which may have a suitable number of flat sides formed therein, for example 8, so that an octagon is provided on the outer surface to accept a wrench or suitable applying tool. The octagon may be formed by expanding from the inside out. A suitable bushing 62 may be fitted in the small end.

Figure 3:
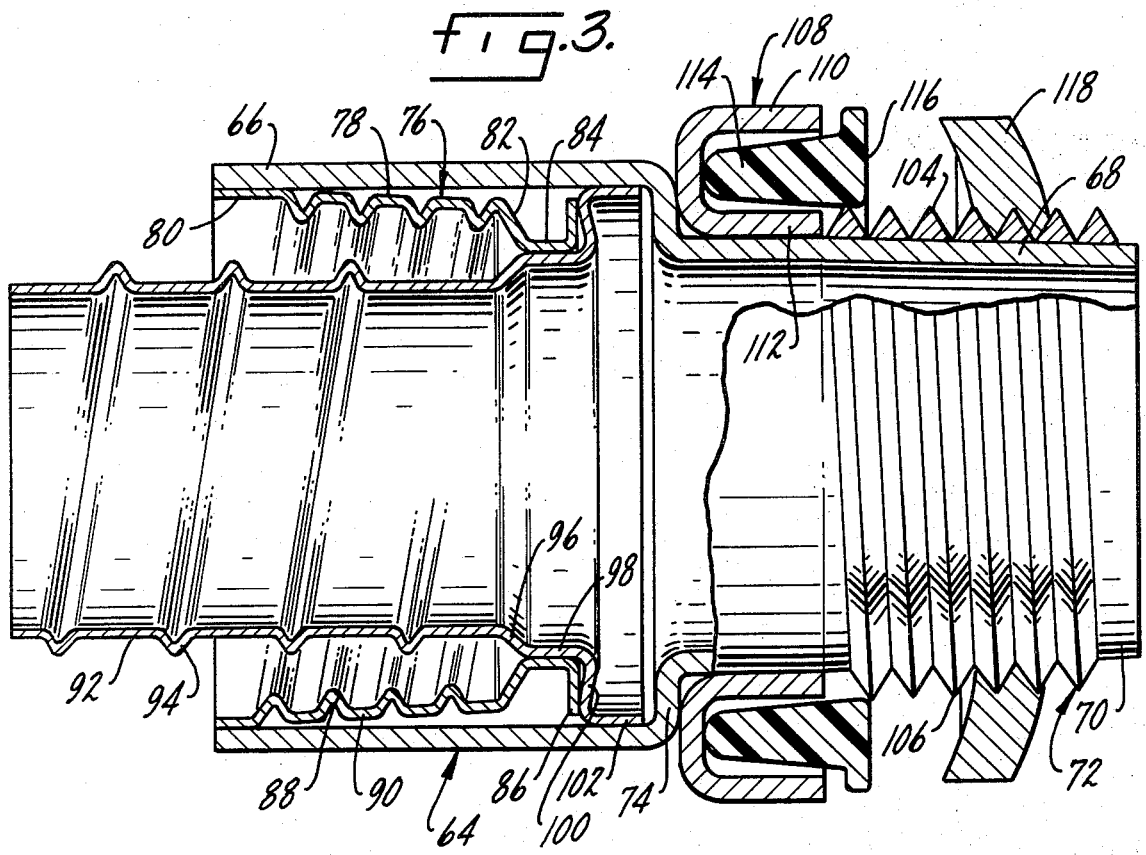
FIG. 3 is a section, similar to FIG. 2, of a modified form and partly in full.

A variant form has been shown in FIG. 3 in which the outer housing 64 is divided generally between a large diameter half 66 and a small diameter half 68 which may taper somewhat in the area 70 under a thread form 72. A shoulder 74 between the two halves may serve as a stop for an insert 76 which may include an inner housing 78 which, like the outer housing, may be made in a press operation from a flat sheet that is drawn into a generally conical shape which tapers from a large end 80 to a small end 82 which is brought into a short cylinder 84 followed by a flared-out flange or lip 86. Threads 88 in the nature of grooves or wrinkles may be rolled into the tapered area 90 to provide threads on the inner surface with a certain pitch. The large end 80 is dimensioned to fit snugly inside of the outer housing or sleeve with metal-to-metal contact. Preferably the small end portion 84 has metal-to-metal contact with a portion of the pilot.

The pilot 92 has a rolled thread 94 of a certain pitch in its main cylindrical portion which is flared out toward the end, at 96, into a cylindrical portion 98 that is metal-to-metal with portion 84 on the small end of the inner housing. The pilot is then flared out at 100 to a cylindrical edge 102 which is at a diameter such that it will fit metal-to-metal inside of the outer housing 64. The portion 102 of the pilot may be the same diameter as the inside of the inner end of the housing which is cylindrical which greatly facilitates assembly.

The thread form 72 on the outside of the housing may be formed by coiling a wire 104 of a suitable length into a generally cylindrical coil and then slipping it over the outer housing. The wire is shown as having a triangular cross-section with one flat side being disposed on the inside of the resulting coil so that the inner surface of the coil presents a smooth cylindrical appearance with the outer edge or point 106 of the triangle forming the crest of the resultant thread. Wire that is triangular in cross-section is particularly appropriate since the sides or flanks of the threads resulting from the triangle will be at 60° which is appropriate for pipe thread.

The wire may be coiled to an internal diameter that is slightly smaller than the outside diameter of the outer housing so that when the cylindrical inner surface of the coil is slipped onto the outer housing, the coil must be slightly expanded first which will thereby give a slight compression or loaded fit. The degree of interference should be sufficiently small such that no great effort is necessary to assemble the two.

A combination octagon and seal 108 is positioned on tthe housing in abutment with the shoulder 74 and may be generally C-shaped in cross-section, with an outer leg 110 that is an octagon and an inner leg 112 that is generally cylindrical. The interior of the octagon may open toward the thread 72 and it may be fitted with a seal or grommet 114 which is tapered into the octagon but extends beyond the open end to a flat face 116 which engages and seals against the wall or side of the housing junction box. The threads 72 may be provided with the usual lock nut or washer 118.

The shoulder 74 may be more or less midway between the ends and may serve as a stop for the insert 76 from one end and for the octagon 108 from the other end. The outer housing may be made in a press operation, for example, on an eyelet-type press, from a flat sheet that is drawn to the shape shown. The inner housing or insert may also be made in a press operation from a flat sheet that is drawn into a generally conical shape which tapers with a large and small end.

In assembly the outer housing or body 64 is drawn first. The octagon or seal retainer 108 is then slipped over the taper. The coil spring 104 is then slipped onto the taper. The insert, the pilot first and then the taper, are slipped in the other end. The parts may all then be brazed in the furnace as a unit.

Brazing the various fabricated parts can be easily and simply accomplished by coating the brazing material on some or all of the parts. For example, referring to FIG. 3, outer housing 64, the taper 78, the pilot 90, the seal retainer and the coil wire may all be substantially, completely or partially covered with brazing material prior to assembly. This has the advantage that all contacting surfaces between adjacent parts will be fused and sealed with brazing material without requiring precision spotting of brazing material on certain areas of certain parts.

Figure 4:
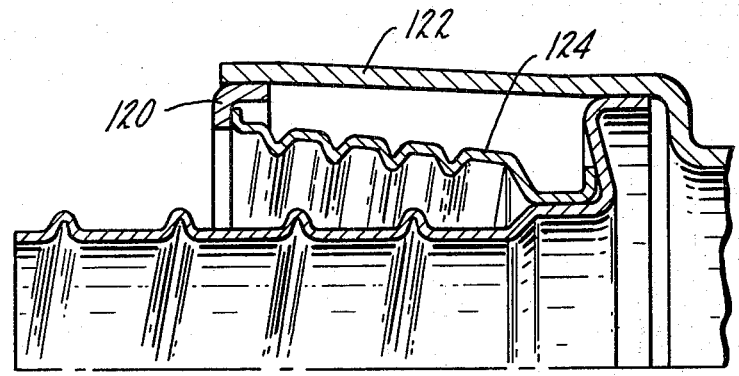
FIG. 4 is a further modification.

FIG. 4 is a part of a modification and shows an insert 120, generally L-shaped in cross-section, and positioned between the outer housing 122 and the large end of the inner housing 124 which functions as a filler and a guide for the outer surface of the neoprene cover of the flexible metallic conduit. The FIG. 4 form is intended specifically for a different size conduit and allows standard parts and tooling to be used throughout most if not all of the line.

The use, operation and function of the invention are as follows:

The connector shown, and the various modifications, are all primarily intended for joining flexible metallic conduit to a terminus such as a box, panel, or what-have-you. This is not to say that certain features of the invention are not applicable to and usable with other types of conduit. But the majority of the important aspects of the invention are concerned with flexible metallic conduit.

In the various forms shown, the pilot is first inserted into the end of the conduit and the threads of the pilot mesh with the simulated threads formed in the metal core or sleeve inside of the rubber or neoprene cover on the conduit. Rotation of the housing, by the octagon form on the outside thereof, will pull the tapered compression chamber down on the end of the conduit with the tapered area inside of the housing contacting and deforming the flexible covering inwardly and forwardly. The threads on the tapered area smoothly indent and lock into the insulation without cutting or fracturing it. When fully mounted, the forward portion of the cover will have extruded forwardly to some degree.

In the various forms shown, the pitch of the threads on the pilot is preferably the same as the pitch of the threads in the tapered portion so that, as the pilot draws the conduit in, the tapered threads will flow smoothly into the flexible covering on the conduit and will not tend to tear or rip it. If the external threads on the pilot are considered single-start threads, then the internal threads on the housing may be considered multiple-start threads, although they may be the same. When the pilot is inserted and rotated so that as the external threads mesh with the internal grooves in the conduit, the conduit will be automatically advanced giving a smooth engagement of the internal tapered threads on the housing with the flexible covering on the conduit.

In the various forms shown, the units have the advantage that they may be factory or shop installed where a substantial number of lengths of flexible metallic conduit have been cut to a predetermined size or length and will be installed on the job site in those lengths. The connectors would be screwed down on the ends of the conduit lengths at the shop and would be taken to the job site and installed.

The units also have the advantage that the soft flexible cover of the metallic conduit that is being compressed inwardly with the metal core is fully supported by the pilot which functions as an anvil for the compression effect on the cover. This is by way of comparison to connectors of this general type which attempt to expand the inside of the flexible metallic conduit outwardly which, due to the resistance to expansion of the metal, is difficult to do and at best results in an inferior connection. Further, the threaded compression effected on the outer deformable covering of the conduit is such that any tendency thereafter of the cover material to cold flow will be counteracted by the threads on the outside of the compression chamber which take a firm bite or grip on the conduit covering so that the seal affected, rather than being purely circular, takes the form of a helical spiral.

In all forms of the invention, very little if any machining is necessary. Nor are any die cast parts required. So the expense of the device is substantially reduced over well-known units.

While I have referred to certain parts as being in the shape of an octagon, it should be understood that they may have any number of sides. An octagon, however, is quite common in this field.

The form shown in FIGS. 1 and 2 does not have any sort of a seal to butt up against the terminus since, in certain applications, it is not felt necessary to seal the connector to the conduit, particularly those applications that are indoors and there is no liquid-tight problem. In that case the octagon may be formed directly in the housing itself, as compared to the FIG. 3 form, which is substantially cheaper.

The inner housing of the FIGS. 1 and 2 form may be made of a suitable tough plastic, for example polypropylene. Its main function is to secure and seal the housing of the outer jacket of the conduit to the housing of the connector and to provide a needed strength against pullout. A sufficiently tight fit may be provided between the plastic and the cylindrical end of the metal housing so that no extra connection, such as gluing or otherwise, may be necessary. But it may be provided, if desired. A press fit is considered adequate.

The FIGS. 1 and 2 form has the added advantage over the FIGS. 3 and 4 form i that the thread detail that can be formed in the plastic piece in the tapered area can be much sharper than that rolled or otherwise formed into the metal tapered piece which will provide better gripping on the conduit. Also, all identification marks, such as trademarks, UL symbols, patent numbers, etc., may be molded directly in the outer surface of the outer flange 18.

Both units have the advantage that they can be machine assembled to the conduit at the shop which takes the human element out of assembly and insures a consistency in the fit. It also cuts down the cost of assembly since these can be pre-made at the shop or at the electrical contractor's place of business and they can ship them out to the building for installation. Machine assembly insures that they will stay in place. Where shop assembly is used, not only may the fitting be preassembled into the end of the conduit which is in standard cut lengths, but the wires may also be threaded through before the whole assembly is taken out to the building.

While the preferred form and several variations of my invention have been shown, described and suggested, it should be understood that suitable additional modifications, changes, substitutions and alterations may be made without departing from the invention's fundamental theme.

I claim:

1. A connector for joining flexible metallic conduit to a terminus, including a fitting having a sheet metal rigid outer housing with a generally open interior, a tapered section in one end of the housing narrowing inwardly and adapted to engage the exterior of the conduit, a thread form on the tapered section adapted to indent the flexible exterior of the conduit, a generally cylindrical pilot in the said one end of the housing with an exterior thread form thereon extending beyond the end of the tapered section adapted to engage the interior of the flexible conduit, and an exterior male thread form on the other end adapted to be connected to a terminus, the conduit engaging inner surface at the said one end of the housing being in the form of a plastic insert fitted on the said one end of the housing with two portions, one inside of the housing and the other outside, overlapping the end of the housing.

2. A connector for joining flexible metallic conduit to a terminus, including a fitting having a sheet metal rigid outer housing with a generally open interior, a tapered section in one end of the housing narrowing inwardly and adapted to engage the exterior of the conduit, a thread form on the tapered section adapted to indent the flexible exterior of the conduit, a generally cylindrical pilot in the said one end of the housing with an exterior thread form thereon extending beyond the end of the tapered section adapted to engage the interior of the flexible conduit, and an exterior male thread form on the other end adapted to be connected to a terminus, the tapered section being in the form of a sheet metal inner housing connected to the outer housing and forming an air space therebetween.

3. A connector for joining flexible metallic conduit to a terminus, including a fitting having a sheet metal rigid outer housing with a generally open interior, a tapered section in one end of the housing narrowing inwardly and adapted to engage the exterior of the conduit, a thread form on the tapered section adapted to indent the flexible exterior of the conduit, a generally cylindrical pilot in the said one end of the housing with an exterior thread form thereon extending beyond the end of the tapered section adapted to engage the interior of the flexible conduit, an exterior male thread form on the other end adapted to be connected to a terminus, and an octagon formation on the outside of the housing having a hollow annular interior opening toward the male thread form and an annular seal in the hollow of the octagon extending beyond the opening thereof so as to engage and seal against the wall of the terminus when the said other end of the housing is inserted through an opening in the terminus.

4. The structure of claim 3 further characterized in that the octagon is U-shaped in cross-section with inner and outer flanges, the inner flange being circular and brazed to the outer surface of the housing, and the outer flange being in the form of an octagon.

5. A connector for joining flexible metallic conduit to a terminus, including a fitting having a sheet metal outer housing, a sheet metal inner housing connected to the outer housing to form an air span therebetween and defining a conduit-engaging inner surface adapted to engage the outside of the conduit in sealing engagement therewith, and a generally cylindrical sheet metal insert in the fitting adapted to engage the inside of the conduit, the outer and inner housings and the insert being formed as a rigid, dimensionally-stable unit which are brazed together.

6. A connector for joining flexible metallic conduit to a terminus, including a fitting having a sheet metal outer housing, a sheet metal inner housing connected to the outer housing to form an air span therebetween and defining a conduit-engaging inner surface adapted to engage the outside of the conduit in sealing engagement therewith, a generally cylindrical sheet metal insert in the fitting adapted to engage the inside of the conduit, a tapered section in the inner housing narrowing to a union with the insert, and a thread form in the tapered section of the inner housing adapted to engage the exterior of the conduit.

7. A connector for joining flexible metallic conduit to a terminus, such conduit including an inner helically wound metal core with an exterior insulating distortable cover, the connector including a unitary housing open at one end and defining an impervious compression chamber to receive and seal against and compress the exterior distortable cover of the end of the flexible conduit inwardly against the helically wound metal core, the compression chamber being defined on the inside by a generally centrally located nonrotatable cylindrical pilot that engages the metal core of the conduit and on the outside by a generally inwardly tapered inner compression surface that engages the distortable cover of the conduit in sealing relationship, the pilot projecting by an amount beyond the area of the tapered inner surface engaged by the distortable cover, the pilot and tapered surface being fixed against movement relative to each other, a thread form on and rising from the outer surface of the pilot formed as a single thread with a multiple pitch and sized such that the thread form will smoothly and evenly engage and will mesh with the interior of the helically wound metal core of the flexible conduit without cutting into the interior of the conduit to provide an axial interlock therewith to draw the exterior distortable cover of the conduit into compressive sealing relationship with the tapered inner surface when the connector is turned down on the end of the conduit, the thread form on the pilot extending a sufficient distance beyond the engaged area of the tapered surface such that sufficient axial interlock between the pilot and helical core of the conduit will be acquired when the outside of the distortable cover engages the tapered inner surface so that, thereafter, the pilot and helical core will remain interlocked during further turning of the connector on the conduit which will cause the distortable cover to be compressed by and sealed against the tapered inner surface, the other end of the housing being open and having an impervious thread form metallurgically united thereto and adapted for connection to a terminus.

8. The structure of claim 7, further characterized by and including a thread form on the tapered inner surface adapted to indent the distortable cover of the conduit during such compressing and sealing engagement.

9. The structure of claim 7 further characterized in that the connector has a sheet metal rigid outer housing.

10. The structure of claim 9 further characterized in that the cover engaging tapered inner surface is in the form of a plastic insert fitted on the end of the connector.

11. The structure of claim 7 further characterized in that the connector includes a sheet metal outer housing, a sheet metal inner housing connected to the outer housing to form an air space therebetween, with the pilot being in the form of a generally cylindrical sheet metal insert in the housings adapted to engage the inside of the conduit, with the outer and inner housings and the insert being formed as a rigid, dimensionally stable unit and brazed together.

12. The structure of claim 7 further characterized in that the thread form on the other end of the housing adapted for connection to a terminus is in the form of a male thread brazed to the exterior of the housing.

13. The structure of claim 7 further characterized in that the generally inwardly tapered nonrotatable inner surface is in the form of a separate plastic insert fitted on the said one end of the housing with two portions, one inside of the housing and the other outside, overlapping the end of the housing.

* * * * *